United States Patent [19]

Morris et al.

[11] Patent Number: 5,567,667

[45] Date of Patent: Oct. 22, 1996

[54] OXIDATION CATALYSTS

[75] Inventors: Michael A. Morris, Sunnyside; Martin Fowles, Danby; William C. Mackrodt, Nr Altrincham, all of United Kingdom

[73] Assignee: Imperial Chemical Industries PLC, London, United Kingdom

[21] Appl. No.: 290,831

[22] PCT Filed: Feb. 19, 1993

[86] PCT No.: PCT/GB93/00356

§ 371 Date: Oct. 21, 1994

§ 102(e) Date: Oct. 21, 1994

[87] PCT Pub. No.: WO93/16799

PCT Pub. Date: Sep. 2, 1993

[30] Foreign Application Priority Data

Feb. 21, 1992 [GB] United Kingdom ............... 9203709

[51] Int. Cl.[6] .................................................. B01J 23/10
[52] U.S. Cl. ........................ 502/302; 502/303; 502/349; 502/355
[58] Field of Search ........................... 502/302, 303, 502/349, 355

[56] References Cited

U.S. PATENT DOCUMENTS

| | | | |
|---|---|---|---|
| 4,656,155 | 4/1987 | Josefowicz | 502/324 |
| 5,075,277 | 12/1991 | Saiai et al. | 502/333 |
| 5,137,862 | 8/1992 | Mackrodt et al. | 502/303 |

FOREIGN PATENT DOCUMENTS

| | | |
|---|---|---|
| 130835 | 1/1985 | European Pat. Off. . |
| 472307 | 2/1992 | European Pat. Off. . |
| 2590887 | 6/1987 | France . |
| 928691 | 6/1963 | United Kingdom . |

Primary Examiner—Shrive Beck
Assistant Examiner—Timothy H. Meeks
Attorney, Agent, or Firm—Cushman Darby & Cushman, L.L.P.

[57] ABSTRACT

An oxidation catalyst composition comprises an intimate mixture of oxides of praseodymium, at least one nonvariable valency Group IIIa element, and, optionally zirconium, said composition containing a total of 5–50% of praseodymium atoms, 0–45% of zirconium atoms, and 20–95% of said non-variable valency Group IIIa element atoms, said percentages being based upon the total number of praseodymium, zirconium, and non-variable valency Group IIIa element atoms in said intimate mixture.

3 Claims, No Drawings

OXIDATION CATALYSTS

OXIDATION CATALYST

1. Field of the Invention

This invention relates to oxidation catalysts, and in particular to catalysts suitable for the combustion of a feedstock with an oxygen-containing gas, eg air, particularly with an excess of the oxygen-containing gas to effect complete combustion.

2. Background of the Invention

In order to reduce the formation of oxides of nitrogen (NOx) when a fuel, eg gaseous hydrocarbons such as natural gas and/or hydrogen, is combusted with air, it is desirable to employ fuel/air mixtures of such composition that the adiabatic flame temperature is relatively low, generally below 1500° C., and desirably below about 1300° C. For many applications this means using a composition that is so rich in air that normal combustion is unstable and may not be self-sustaining. Catalytic combustion wherein a mixture of the fuel and air is passed through a bed of a combustion catalyst, enables such problems to be overcome.

One application wherein catalytic combustion is desirable is in gas turbines. At initial start-up of a gas turbine, a mixture of the fuel and air, preheated, for example by a pilot burner, to a temperature typically of the order of 600°–800° C. when the fuel is methane or natural gas, is fed, normally at superatmospheric pressure, eg at a pressure in the range 2 to 20 bar abs., to the inlet of the combustion catalyst bed. Combustion is effected at the catalyst surface forming a gas stream at elevated temperature. There is a rapid rise in the temperature of the catalyst bed to about the adiabatic flame temperature, typically about 1200° C., when the catalyst lights-off. The point at which this occurs is associated with the pre-heat temperature and the catalyst activity. Before light-off occurs, the solid temperature rises exponentially along the bed length. When the catalyst lights-off, the whole of the catalyst may be at essentially the adiabatic flame temperature. The average temperature of the gas mixture increases more gradually through heat transfer from the solid to the gas phase. The gas temperature rises gradually even when the catalyst is lit-off, ie the catalyst front face is at the adiabatic flame temperature. When the temperature of the gas mixture reaches a value, typically about 900° C., at which homogeneous combustion commences, there is a rapid increase in the gas temperature to about the adiabatic flame temperature. Where, as is usual, the catalyst body is in the form of a monolith with through channels, eg a honeycomb configuration, a higher temperature may be required to achieve homogeneous, ie gas phase, reaction since there is some evidence to suggest that the monolith channels may quench gas phase reactions.

When operating a gas turbine with catalytic combustion, when combustion has been established, it is usually desirable to decrease the preheating of the feed, eg to the temperature, typically about 300°–400° C. corresponding LD the discharge temperature of the compressor compressing the air and fuel.

One important criteria is that the catalyst has to withstand heating to relatively high temperatures, considerably above 1000° C., without loss of its low temperature activity. This means that catalysts containing Group VIII elements, or compounds thereof, are unsatisfactory in view of their volatility, and/or their tendency to sitter at the temperatures encountered.

Also, in gas turbine operation using catalytic combustion, the catalyst not only has to be able to withstand high temperatures, but also withstand the thermal shock of rapid temperature changes resulting from repeated stopping and starting of combustion. Also gas turbines are usually operated using high gas flow rates. These conditions impose severe restraints on the materials that can be utilized as the catalyst.

In EP-A-0472307 there are described catalysts based on combinations of certain oxides of elements of Groups IIIa and, possibly Group IVa, of the Periodic Table. Preferred catalysts contained a host oxide such as ceria, zirconia or hafnia; an oxide of a variable valency element such as ceria, praseodymia, titania, or terbia: and an oxide of a non-variable valency Group IIIa element, such as lanthana.

SUMMARY OF THE INVENTION

We have now found compositions, which in some cases, exhibit even superior high temperature stability to those compositions, although the low temperature activity may not be so good.

Accordingly the present invention provides a catalyst composition comprising an intimate mixture of oxides of praseodymium, at least one non-variable valency Group IIa element, and, optionally zirconium, said composition containing a total of 5–50% of praseodymium atoms, 0–45% of zirconium atoms, and 20–95% of said non-variable valency Group IIIa element atoms, said percentages being based upon the total number of praseodymium, zirconium, and non-variable valency Group IIIa element atoms in said intimate mixture.

DETAILED DESCRIPTION OF PREFERRED EMBODIMENTS

The intimate mixture is preferably substantially free from other elements, eg Group VIII elements, or compounds thereof, since such compounds tend to lack stability at high temperatures.

The compositions of the invention my be zirconia-free, in which case the proportion of non-variable valency Group IIIa atoms is 50–95%, preferably 50–90%, of the total praseodymium and non-variable valency Group IIIa atoms, or may contain zirconia: preferably the compositions contain zirconia in such an amount that the zirconium atoms constitute at least 5% of the total praseodymium, zirconium and non-variable valency Group IIIa atoms. Preferably the proportion of zirconium atoms is less than 30%, and the proportion of non-variable valency Group IIIa atoms is at least 40%, of the total number of zirconium, praseodymium and non-variable valency Group IIIa atoms.

The non-variable valency Group IIIa atoms may be selected from scandium, yttrium, and the rare earth elements other than praseodymium, terbium, and cerium. Preferred non-variable valency Group IIIa elements are yttrium, lanthanum, and neodymium. Mixtures of such non-variable valency Group IIIa elements may be employed. While the compositions may also contain oxides of the other variable valency Group IIIa elements cerium and/or terbium, the presence of such compounds is preferably avoided. Preferably the proportion of variable valency Group IIIa elements, other than praseodymium, is less than 5% of the total number of zirconium and Group IIIa element (including variable valency Group IIIa elements) atoms in the composition.

The composition will often be employed in a supported form, ie as a coating of the intimate oxide mixture on a suitable support. Often zirconia, stabilized with eg yttria, may be used as a support, particularly as a secondary support on a refractory oxide primary substrate, to minimize migration of the catalytically active composition into the primary support and vice versa.

For use as a catalyst the compositions preferably have a surface area, as measured by the BET method, of at least 1 $m^2/g$. As originally produced the compositions may have a considerably higher surface area: however on heating to high temperatures, some surface area may be lost. Accordingly it is preferred that the compositions are such that they have a surface area of at least 1 $m^2/g$ after heating for 8 hours at 1200° C.

Suitable compositions may be made by precipitation. Thus the intimate mixture of oxides may be formed by precipitating compounds of the relevant metals as compounds as oxides, or as compounds that decompose to oxides upon heating, from a solution of a suitable compound, eg nitrate, of the relevant element. The precipitation is conveniently effected from an aqueous solution using a precipitant such as an aqueous solution of an alkali metal, or ammonium, hydroxide or carbonate. The compounds required in the composition may be co-precipitated, eg by precipitation from a solution containing a mixture of compounds of the desired metals. After precipitation, the precipitate is washed to remove traces of the precipitant, dried, and then calcined if necessary to decompose the precipitated compounds to the oxides.

Other methods of producing suitable intimate mixtures are known in the art and include evaporation of a solution containing a mixture of thermally decomposable compounds, especially nitrates, of the relevant metals to dryness followed by calcination to decompose the compounds to the oxides. Preferably the solution my contain an organic complexing acid, eg citric acid.

As indicated above the catalyst will generally be required in a supported form: a suitable refractory support, eg zirconia, alumina, mullite, or silicon carbide, preferably in the form of a honeycomb having a plurality of through passages, preferably at least 25 passages per $cm^2$ of the honeycomb cross sectional area, may be coated with a slurry of the catalyst composition, followed by firing to form an adherent coating. Alternatively the catalyst may itself be formed into the desired shape, eg by extrusion into a honeycomb structure by the process described in GB-A-1385907, particularly using the technique described in EP-A-134138. However in order to provide a catalyst that can withstand the thermal shock that is liable to be encountered in some catalytic combustion applications, eg gas turbines, where the catalyst is to be used in a self-supporting form, it is preferred that it is produced in the form of a ceramic foam, for example by the processes described in GB-A-1537549 and GB-A-2027688. Alternatively the catalyst may be a coating on such a foam made from a suitable support material.

For catalytic combustion, typical operating conditions for the catalyst involve the passage of preheated fuel gas, eg natural gas, and air through a bed of the catalyst, eg through one or more honeycomb structures supporting or composed of the catalyst. During passage through the catalyst bed, combustion takes place with consequent increase in temperature. The outlet temperature is typically above 1000° C., particularly above 1100° C.

In gas turbine applications, the flow rate of the fuel gas and air is high; typically the linear velocity of the fuel and air mixture through the catalyst is in the range 25–150, particularly 50–100, m/s.

Another catalytic combustion application for which the catalysts are particularly suited is as catalysts in radiant burners.

In addition to catalytic combustion, other oxidation processes are often operated at temperatures where stability of the catalyst is desirable. Examples of such other oxidation processes include partial oxidation of feedstocks such as propane, methane coupling, ammonia oxidation, the oxidative decomposition of nitrous oxide, and steam reforming of hydrocarbons. In addition, the catalysts of the present invention may be useful in oxidation reactions effected at relatively low temperatures, eg the oxidation of paraxylene to terephthalic acid.

EXAMPLES

The invention is illustrated by the following examples in which a series of cataysts were prepared by forming an aqueous solution of nitrates of the desired elements in the desired proportions: where zirconia was desired in the composition the zirconium was introduced as zirconium oxychloride. Citric acid was added to the solutions and the latter were then evaporated to dryness in a rotary evaporator at 90° C. The resulting mixture was then calcined at 450° C. for four hours to convert the respective metal compounds to the intimate mixture of oxides.

A sample of the catalyst was heated in a stream of air for 8 hours at the specified temperature to "age" the catalyst and then crushed and sieved to obtain a size fraction in the range 1.0–1.4 mm diameter. A known weight, occupying a volume of about 2.5 $cm^3$, of the aged material is charged to an electrically heated reactor provided with an outlet gas analyzer to monitor the carbon dioxide content of the outlet gas. A mixture of air containing 2% by volume of methane is passed through the reactor at atmospheric pressure at a rate of 0.5 $m^3/h$ and the temperature increased from ambient to 400° C. at a rate of 400° C./h, and then at a rate of 200° C./h until the monitored carbon dioxide content of the outlet gas indicates that the combustion is complete. To aid comparison of different catalysts, the activity is quoted as the rate of carbon dioxide formation per gram of catalyst at a temperature of 550° C. The compositions and activities are shown in the following table.

| Ex- | Composition (% by metal atoms) | | | | Activity (mmol/h/g @550°C.) after ageing at temp (°C.) | | |
|---|---|---|---|---|---|---|---|
| ample | Zr | Pr | Other | | 120 | 1300 | 1400 |
| 1+ | 50 | 0 | 50 | Nd | 1.0 | | |
| 2+ | 47.5 | 2.5 | 50 | Nd | 1.2 | | |
| 3+ | 45 | 5 | 50 | Nd | 1.0 | | |
| 4 | 40 | 10 | 50 | Nd | 1.5 | | |
| 5 | 43 | 28.5 | 28.5 | Nd | 7.1* | | |
| 6 | 43 | 28.5 | 28.5 | Gd | 7.2* | | |
| 7 | 30 | 50 | 20 | Gd | 2.7 | | |
| 8 | 0 | 10 | 90 | Yt | 7.4 | | |
| 9 | 0 | 20 | 80 | Yt | 9.6 | 4.1 | |
| 10 | 10 | 10 | 80 | Yt | 3.9 | 5.4 | |
| 11 | 10 | 30 | 60 | Yt | 5.3 | 6.7 | |
| 12 | 10 | 50 | 40 | Yt | 4.4 | 2.1 | |
| 13 | 20 | 30 | 50 | Yt | 3.8 | 4.2 | 1.7 |
| 14 | 30 | 20 | 50 | Yt | 3.5 | 3.0 | |
| 15 | 30 | 35 | 35 | Yt | | 2.3 | 0.8 |
| 16 | 30 | 50 | 20 | Yt | 2.4 | 2.7 | 0.8 |
| 17 | 44 | 13 | 43 | Yt | 2.2 | | |

*activity at 600°C.
+comparative

We claim:

1. A zirconia free catalyst composition consisting essentially of an intimate mixture of a total of 5–50% of praseodymium atoms and 50–954 of non-variable valency Group IIIa element atoms, said percentages being based upon the total number of praseodymium and non-variable valency Group IIIa element atoms, and less than 5%, based on the total number of Group IIIa element atoms, of variable valency Group IIIa element atoms other than praseodymium.

2. A catalyst comprising a coating of a composition according to claim 1 on a support comprising zirconia stabilized with yttria.

3. A process for the catalytic combustion of a gaseous fuel comprising passing a preheated mixture of said fuel and air through a bed of a catalyst comprising a zirconia-free composition consisting essentially of an intimate mixture of a total of 5–50% of praseodymium atoms and 50–95% of non-variable valency Group IIIa element atoms, said percentages being based upon the total number of praseodymium and non-variable valency Group IIIa element atoms, and less than 5%, based on the total number of Group IIIa element atoms, of variable valency Group IIIa element atoms other than praseodymium, said mixture of fuel and air being preheated to a temperature in the range 300°–400° C. whereby combustion of said fuel takes place during passage through said catalyst bed.

* * * * *